UNITED STATES PATENT OFFICE.

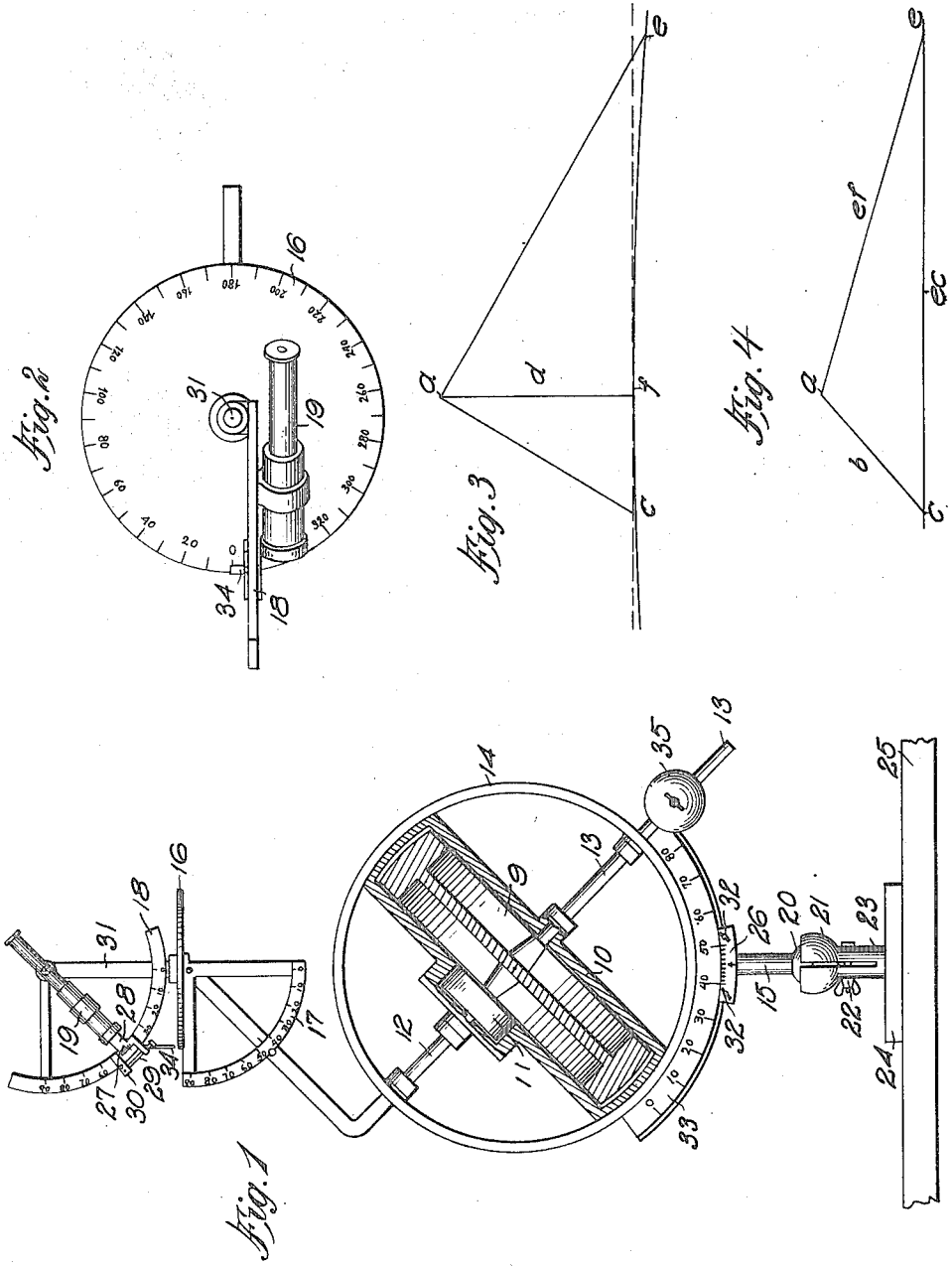

CHARLES SEMMES STANWORTH, OF NORFOLK, VIRGINIA.

SPEED AND RANGE FINDER.

1,206,481.     Specification of Letters Patent.     Patented Nov. 28, 1916.

Application filed October 14, 1915. Serial No. 55,845.

*To all whom it may concern:*

Be it known that I, CHARLES S. STANWORTH, a citizen of the United States, and a resident of Norfolk, in the county of Norfolk and State of Virginia, have invented a new and Improved Speed and Range Finder, of which the following is a full, clear, and exact description.

Among the principal objects which the present invention has in view are: to provide an instrument which may be initially set and subsequently held in the set position; to provide an instrument mounted as indicated, with means for operating a sighting device, and for determining the angular arrangement thereof to the original disposition; to provide the apparatus with gyroscopically-controlled steadying means; and to provide means for determining the center of gravity of the apparatus.

*Drawings.*—Figure 1 is a side view of an apparatus constructed and arranged in accordance with the present invention, the gyro and case therefor being shown in section; Fig. 2 is a top view of the operating table; Figs. 3 and 4 are diagrams showing a system of triangulation employed by an observer on an aeroplane or other air craft when using a finder constructed and arranged in accordance with the present invention.

*Description.*—As seen in the drawings, a rotor or gyro 9 is pivotally mounted in a casing 10, wherein the atmosphere has been removed to form a partial vacuum. To drive the gyro, an electric motor 11 is operatively connected therewith, and for facilitating the general construction is inclosed within the casing 10. The casing 10 is in part supported by rod sections 12 and 13, which sections extend through a supporting ring 14, which has a sliding engagement with, to be supported by, a standard 15. The rod section 12 forms a support for a calibrated table 16, whereon are erected quadrants 17 and 18. Preferably, the quadrant 17 is disposed beneath and the quadrant 18 is disposed above the table 16. The calibrations on the two quadrants are arranged to indicate respectively the angle which the axes of the sections 12 and 13 bear to the table 16, and the angle which the axis of a telescope 19 bears to the said table.

The standard 15 has, at the foot end thereof, a ball 20 fitting a split cup socket 21. The socket 21 is divided, as shown best in Fig. 1 of the drawings, and the sides are drawn together to clamp and rigidly hold the ball 20 when moved to so function by the manipulation of the wing nut 22. The socket 21 is integral with a stud shaft 23, the foot plate 24 whereof is rigidly fastened to the floor 25 of an aeroplane or similar structure.

Attached to the standard 15, is a vernier plate 26, the calibrations whereon allow for finer adjustment of the ring 14 and corresponding close reading of the angle thereof to the vertical as represented by the axis of said standard. A similar vernier is indicated by the numeral 27 at the end of an arm 28 whereon the telescope 19 is mounted. A feed screw 29 is provided in connection with the arm 28, and a fixed clamp 30, whereby is moved the arm 28 and telescope carried thereby for adjusting the same in suitable angular relation to the axis of the mast 31.

With an apparatus constructed and arranged as described and as shown in the accompanying drawings, care is exercised in preliminarily setting the same. The nut 22 is loosened, if previously made tight, and the ring 14 and gyro contained therein is shifted until the axes of the sections 12 and 13 lie directly north and south. The latitude of the position being known, the wing nuts 32 are loosened and the ring 14 is swung about its center until the reading on the calibrated plate 33 corresponds with the latitude of the location. The plate 33 being graduated from "0" to "90" and occupying a quarter section of the ring 14, and extending between the axes of the sections 12 and 13 and the central plane of the gyro, the scale markings being set to correspond with the latitude of the location, disposes the sections 12 and 13 in parallel relation to the poles of the earth. The nut 22 is then tightened. The central plane of the gyro being perpendicular to the axes of the sections 12 and 13, it follows that the central plane of the gyro is parallel with the equatorial plane of the earth. Having so established the instrument, the gyro is spun until it has attained sufficient momentum to resist axial displacement in a manner peculiar to gyroscopes. The nut 22 is now released, the standard 15, table 16, and parts connected therewith, being thereafter held immutable by the gyro 9, which is unremittingly driven by the motor 11.

The areoplane or vehicle on which the finder is mounted may now maneuver without reference to the finder, which, it will be found, at all times preserves the axial direction of the sections 12 and 13 and the fixed relation of the table 16 thereto. The table 16 is calibrated to show the degrees of a circle, "0" being placed preferably at the north, and "180" at the south. The calibration mentioned is furnished to show the angularity of the quadrant 18 to the true north. The arm 28 is shifted on the center of the quadrant 18, and the angle indicated by the calibration thereon is the angle of inclination or declination, as the case may be.

*Operation.*—The operation when employing an instrument such as described is as follows: If the problem is to ascertain the speed of travel of the aeroplane or vessel on which the instrument is mounted, the telescope 19 is first set to a known angle and an object in advance is sighted. The time is noted and the telescope is shifted to a second angle of smaller sine and the time when the object now again passes the center of the telescope is noted. The altitude of the machine at the time is ascertained by the usual method and by a table of calculations provided. The angle being known and the height being known, the time compares with the distance, reckoned in miles. By simple calculation, the standard expression of rate may be ascertained. If the object be to ascertain the speed, so as to indicate the aim when dropping a missile, it is evident that the rate of drift of the missile when released being known, the telescope may be set at an angle corresponding with the rate of travel, and when thus set, if the aviator releases the missile when the object passes over the vision of the telescope at the center thereof, the missile will strike the spot on the earth picked up by the telescope. If the instrument is to be used for range-finding, the manner of use is somewhat altered, and the calibration of the table 16 is called into play. Thus, as seen in Figs. 3 and 4, if the aviator in passing a point indicated in Figs. 3 and 4 by the letter *a*, sets the telescope laterally on the line indicated in Fig. 4 by the letter *b*, to pick up an object located at *c*, indicated in both views of the drawings, by noting the height at the moment as represented by the vertical line *d*, he can ascertain by a problem in triangulation, the length of the horizontal or base line *b*. Having ascertained this, the information may be transferred by signal, to an observer located at *e*, who, by his instrument, notes the angle of inclination *a*, *e*, *f*, and noting the height as communicated by the aviator, the observer has the side *a*, *d*, *f* of the triangle *a*, *e*, *f*, which gives him the length of the line *e*, *f* of the plan shown in Fig. 4. The aviator having communicated the length of the line *b* and the angle of the declination or inclination from the north, as marked by the pointer 34 on the table 16, the observer at *e* may quickly and readily plat the triangle *a*, *e*, *c*, and ascertain the distance and the angle of the range represented by the line *e*, *c*. To accommodate the aviator or observer, the mast 31 is disposed co-axial with the standard 15. If the aeroplane or vessel move or change its course in a horizontal plane, the sections 12 and 13 remaining invariably pointed to the north, the elbow or joint thereof relatively moves around within the body of the aeroplane, while the mast 31 being centered, remains relatively motionless and the quadrant 18 and telescope 19 mounted thereon are freely and readily turned by the aviator on the object to be sighted. The sliding weight 35 is employed to counterbalance the elbow of the section 12 and the parts supported thereby, to avoid imposing on the bearings of the gyro or of the sections 12 and 13, an unnecessary friction.

Claims:

1. An apparatus as characterized, comprising a sighting instrument; a pivotal support therefor; a device for determining the angular disposition of said instrument in a vertical plane; means for fixing the operative disposition of said device in its relation to said support; and means for maintaining the fixed disposition of said device independent of said support.

2. An apparatus as characterized, comprising a sighting instrument; a supporting structure for said instrument embodying a pivotal mounting and a calibrated quadrant disposed concentric to said mounting; a disk-like table disposed in supporting relation to said structure and having calibrations thereon for determining the angular relation of said structure to said table; means for fixing the operative disposition of said quadrant in its relation to said supporting structure; and means for maintaining immutable said disposition of said quadrant independently of said supporting structure.

3. An apparatus as characterized, comprising a sighting instrument; a supporting structure for said instrument embodying a pivotal mounting and a calibrated quadrant disposed concentric to said mounting; a disk-like table disposed in supporting relation to said structure and having calibrations thereon for determining the angular relation of said structure to said table;

means for fixing the operative disposition of said quadrant independently of said supporting structure; means for maintaining immutable said disposition of said quadrant; and a supporting structure for said table embodying a pivot for said table arranged for permitting the table to swing in a plane corresponding with the fixed disposition of said quadrant.

CHARLES SEMMES STANWORTH.

Witnesses:
O. B. McLEAN,
J. K. WELLS.